United States Patent [19]
Johnson

[11] Patent Number: 4,986,755
[45] Date of Patent: Jan. 22, 1991

[54] ACOUSTIC TARGET DOPPLER SIMULATOR

[75] Inventor: James K. Johnson, Placentia, Calif.

[73] Assignee: The United States of America as represented by the Secretary of the Navy, Washington, D.C.

[21] Appl. No.: 501,074

[22] Filed: Mar. 28, 1990

[51] Int. Cl.$^5$ .............................................. G09B 9/00
[52] U.S. Cl. ........................................ 434/008; 367/1
[58] Field of Search ............... 367/1, 137, 904; 434/6, 434/8, 10

[56] References Cited
U.S. PATENT DOCUMENTS 3,713,081  1/1973  Murpharee ............................... 367/1
4,086,560  4/1987  Johnston et al. ........................ 367/1

Primary Examiner—Thomas H. Tarcza
Assistant Examiner—Daniel T. Pihulic
Attorney, Agent, or Firm—Kenneth L. Warsh; Robert Wohlfarth

[57] ABSTRACT

It is useful to a sonar instructor to have a device which simulates Doppler shifting of recorded sonar signals. Such a device can consist of a digitizer operating at a fixed rate storing data in RAM. A variable read rate is calculated based on the desired Doppler shifting. Data are read from RAM at a variable rate higher or lower than the fixed rate and converted D to A before being sent to the student sonar operator.

1 Claim, 1 Drawing Sheet

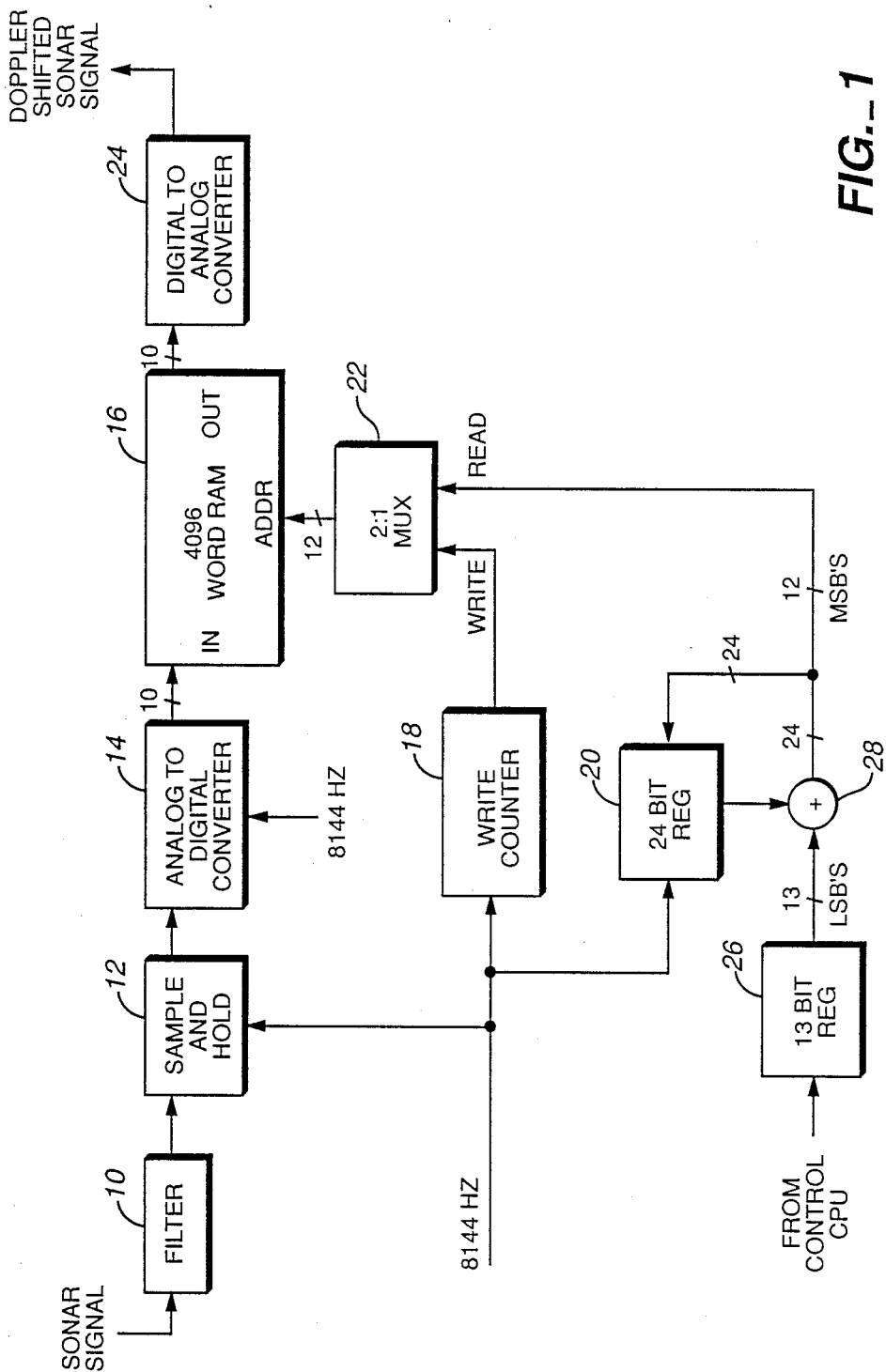
FIG._1

ACOUSTIC TARGET DOPPLER SIMULATOR

FIELD OF THE INVENTION

This invention pertains to a method and apparatus for modifying recorded sonar signals to simulate Doppler shifting of a sonar signal.

BACKGROUND OF THE INVENTION

Recordings of sonar signals are used to train sonar operators. Magnetic recordings of an acoustic target provide training realism flexibility at low cost. As a target moves toward or away from the sonar receiver, the signals should be shifted in frequency in proportion to the speed of separation. It would be desirable if an instructor could Doppler shift recorded signals sent to the student to simulate motion of an acoustic target.

Doppler occurs when the range is increasing or decreasing between the sonar sensors and the target. The amount of frequency shift due to Doppler (D) is a function of range rate (r) and the velocity of sound (c) in the ocean.

$$D = (c-r)/c \quad (1)$$

$$f_o = f_s D \quad (2)$$

Where
$f_o$ = observed frequency
$f_s$ = source frequency

Representative Doppler ratios for $+/-60$ Knots of range rate are 0.98 to 1.02. For closing range rates, the frequency of the arriving signal increases.

U.S. Pat. No. 2,809,445 to Hartig et al describes a mechanical training device using synthetic signals simulated by a crude generator. U.S. Pat. No. 2,863,227 to Chubb et al discloses recording of video and audio information for a sonar operator during an actual run while tracking a submarine for use in training.

U.S. Pat. No. 3,040,445 to McClelland discloses a device for sonar training including means for automatically making magnetic tape recordings for correlating the echo-ranging signals of sonar and radar sets with training display equipment.

U.S. Pat. No. 3,713,081 to Murphree discloses a sonar trainer including Doppler effects generator wherein Doppler simulation is achieved by converting the transmitted sonar signal to digital form, reading it into a memory means at a predetermined rate, reading it at a different rate determined by rate of change of range and reconverting the read-out to analog form for processing by an echo generator.

U.S. Pat. No. 3,829,596 Murphree discloses a sonar reverberation simulator involving a digitizer for an orginal sonar signal, storing same in memory means, each signal at a different address, read-out means, digital to analog converter and means for adjusting the amplitude for reverberation simulation.

U.S. Pat. No. 3,835,234 to Murphree discloses a synthesizer for submarine echoes wherein the strength of the echo points can be made a function of aspect or nature of the object, including digitizing, storage, read-out and a multiplying digital-to-analog convertor.

OBJECTIVES OF THE INVENTION

It is therefore a primary objective of the present invention to provide a simple inexpensive means of Doppler shifting recorded sonar signals.

SUMMARY OF THE INVENTION

These objects of the invention and other objects, features and advantages to become apparent as the specification progresses are accomplished by the invention according to which, briefly stated, analog sonar signals are digitized at a fixed rate and stored in a random access memory. The data are read from this memory at said fixed rate multiplied by the desired Doppler ratio.

LIST OF ADVANTAGES OF THE INVENTION

An important advantage of the present invention is that recorded signals can be doppler shifted under the control of a sonar instructor.

This and further objectives, constructional and operational characteristics, and advantages of the invention will no doubt be more evident to those skilled in the art from the detailed description given hereinafter with reference to the accopmpanying drawing which illustrates a preferred embodiment by way of non-limiting example.

BRIEF DESCRIPTION OF THE DRAWING

The FIG. is a block diagram of the simulator of the invention.

GLOSSARY

The following is a glossary of elements and structural members as referenced and employed in the present invention.
10 low pass filter
12 sample and hold circuit
14 analog-to-digital converter
16 random-access-memory (RAM)
18 write address counter
20 read address register
22 multiplexer
24 digital-to-analog converter
26 Doppler register
28 address

DESCRIPTION OF THE PREFERRED EMBODIMENTS

Analog sonar data are low-pass filtered (in filter 10) to prevent aliasing of the signals digitized output. After passing through sample and hold circuit 12 and after analog-to-digital conversion (in convertor 14) at a base rate (R), the resulting input samples are stored in sequential memory locations of the sample storage RAM 16. A write address counter 18 is incremented by 1 to provide the address for the next sample to be stored.

After a sample is stored, the address from the read address (24 bit) register 20 is used (through multiplexer 22) to access a previously stored sample. This sample read from RAM 16 is converted to an analog voltage level in a digital-to-analog conveter 24. This signal is output from this circuit as the Doppler-shifted signal. To calculate the next read address, the Doppler value stored in a (13 bit) register 26 is added (in adder 28) to the present address and stored in the read address register 20. Both the read address 20 and the Doppler register 26 must contain fractional bits. The number of fractional bits determines the resolution in range rate. With 12 fractional bits the range rate resolution is approximately 0.07 Knots.

The Doppler value is developed in a scenario control computer (not shown) which updates target position, bearing, range, and range rate at a frequent intervals.

The doppler value is computed as a function of range rate and acoustic sound velocity and transmitted to the Doppler register 26.

There are a finite of storage locations in RAM 16 for samples. When the last address is used (stored or read), the next sample will be taken from or stored in the lowest address. Use of this circular RAM technique results in minor discontinuities in the output data stream. If range is decreasing, Doppler is up and read address increments faster than the store address. Therefore, data read at intervals determined by the RAM size and Doppler value will "catch up" to the store address. When this occurs, the data output will be repeated for a sample series equal to the number of storage locations in RAM. For down Doppler, the store address is larger than the read increment. The store, therefore, "catches up" to the read address. When this occurs, a block of samples is lost. The block length is the same as for up Doppler.

These discontinuities occur at intervals determined by the size of RAM and the base store rate for a fixed Doppler. With a base rate of 6K Hertz and 4K words of RAM storage, these discontinuities do not significantly impact aural fidelity or electronic signal processing for normal tactical situations.

This invention is not limited to the preferred embodiment and alternatives heretofore described, to which variations and improvements may be made, without departing from the scope of protection of the present patent and true spirit of the invention, the characteristics of which are summarized in the following claims.

What is claimed is:

1. A method of simulating Doppler shifting of a record sonar signal comprising the steps of:
    (a) digitizing the signal at a fixed write rate,
    (b) storing the digitized signal in a random access memory having a lowest and a highest address and a fixed number of storage locations between, said storing being done at sequential addresses until said highest address is reached, a next address after highest address being said lowest address,
    (c) determining a read rate which is different from said fixed write rate by an amount sufficient to achieve the desired amount of Doppler shifting,
    (d) reading the signal from said random access memory at said read rate, such that when said read rate exceeds said write rate and a read address thereby catches up to a write address, previous data sequence of all locations in storage is repeated, and
    (e) converting the digital signal read from memory to analog signal.

* * * * *